United States Patent Office 3,749,709
Patented July 31, 1973

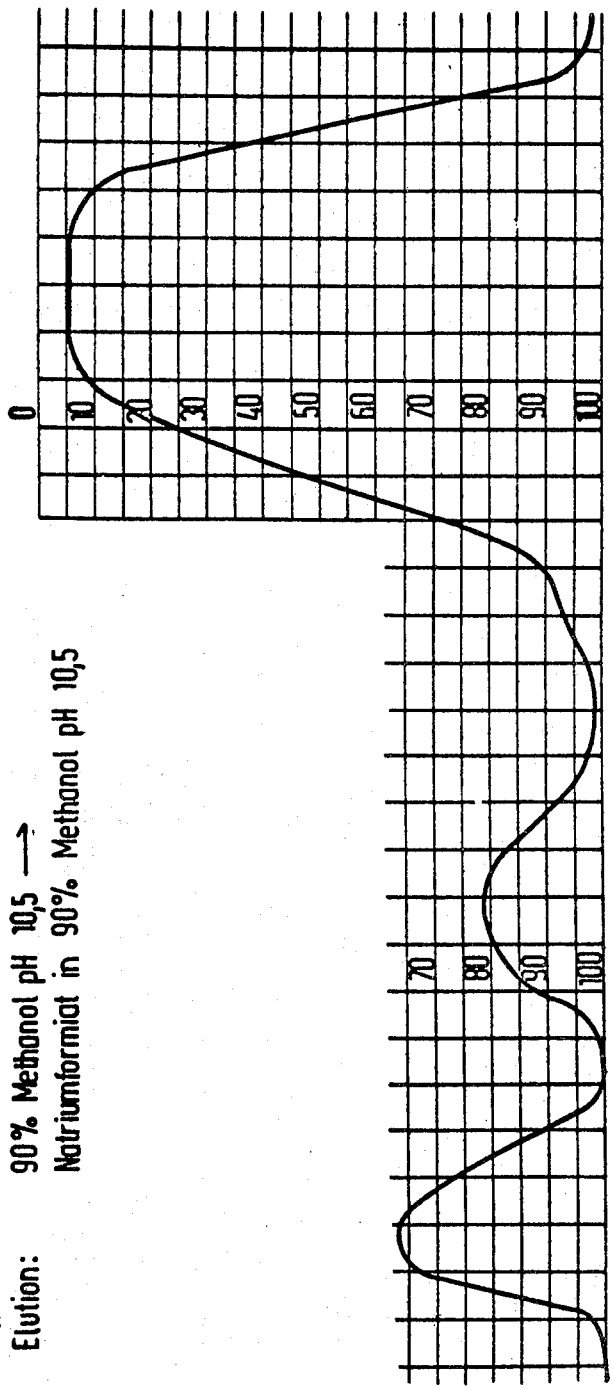

3,749,709
PROCESS FOR THE PURIFICATION OF REDUCED PYRIDINE COENZYMES
Michael Nelboeck-Hochstetter and Klaus Beaucamp, Tutzing, Upper Bavaria, Germany, assignors to Boehringer Mannheim GmbH, Mannheim-Waldhof, Germany
Filed Mar. 11, 1969, Ser. No. 806,239
Claims priority, application Germany, Mar. 20, 1968, P 17 67 010.9
Int. Cl. C07d 51/50
U.S. Cl. 260—211.5 R        10 Claims

ABSTRACT OF THE DISCLOSURE

Process for the chromatographic purification of reduced pyridine coenzymes which comprises utilizing columns charged with weakly basic anion exchange resins which are not present in the hydroxyl form and carrying out the elution with an alkaline elution agent having a pH greater than 7.5.

---

Figures 1, 1A:
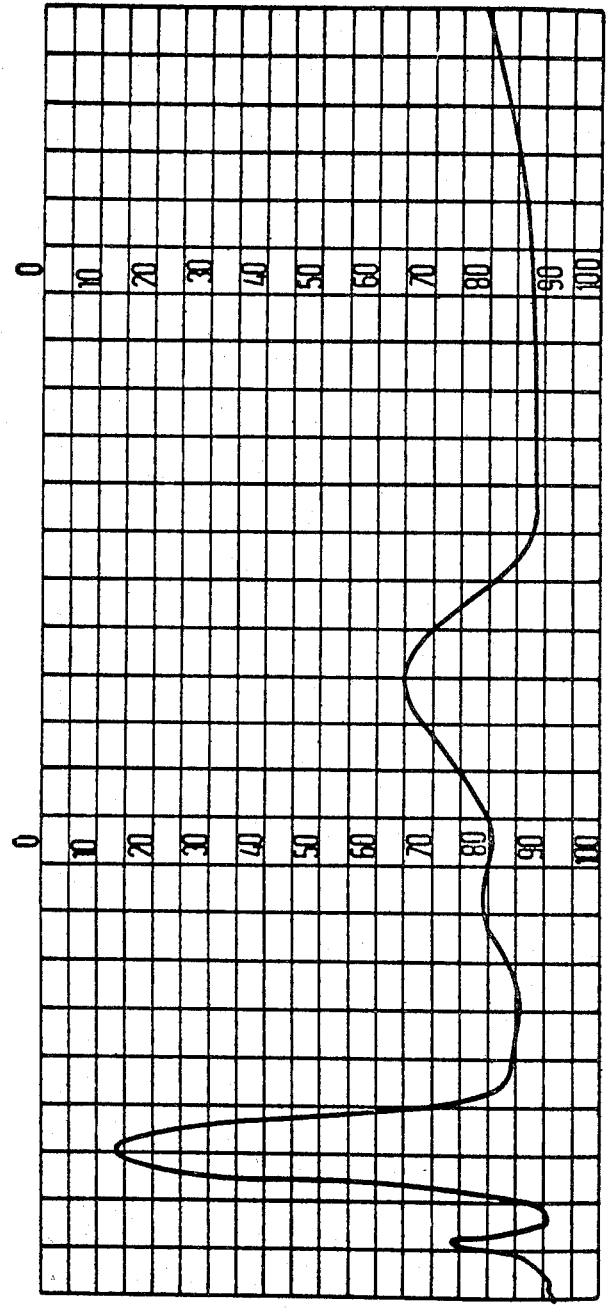
Figure 1B:
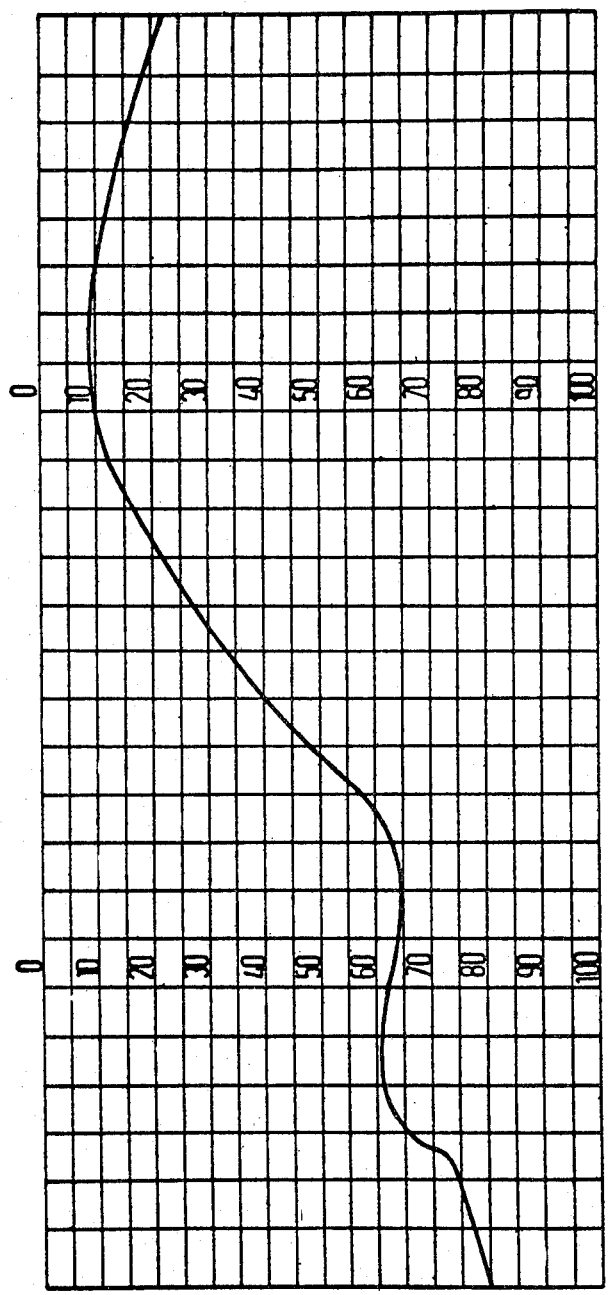
Figure 1C:
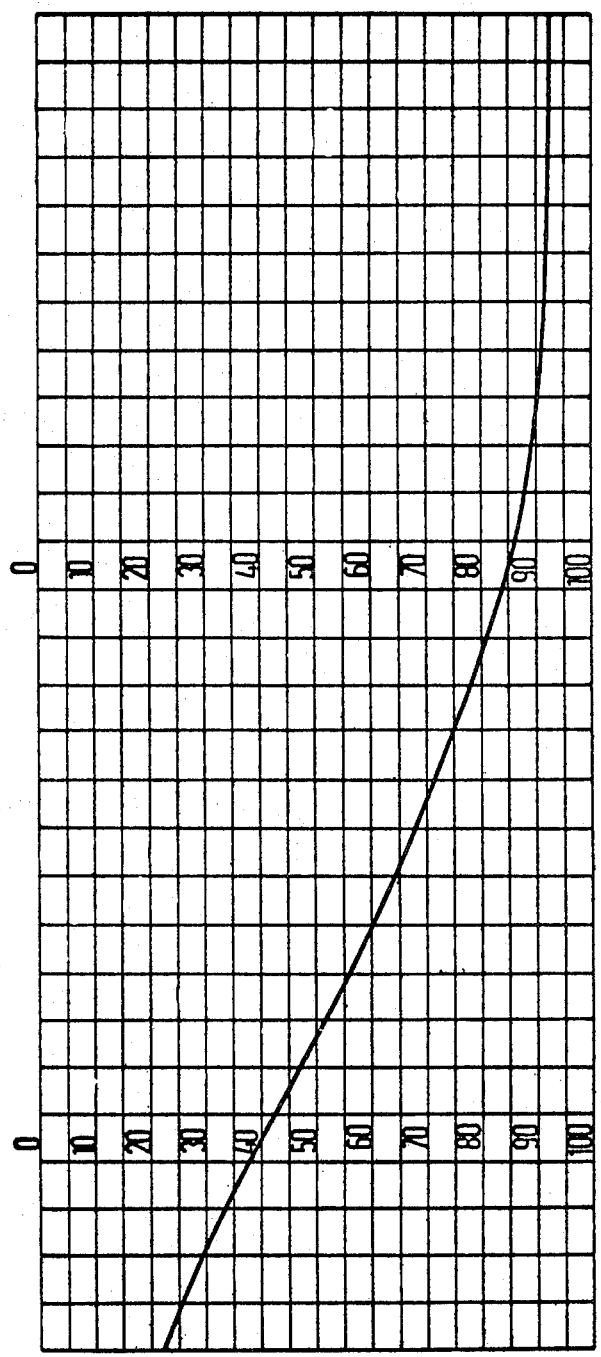

The present invention relates to a process for the purification of reduced pyridine coenzymes utilizing ion exchangers. More particularly this invention relates to a process for the purification of reduced pyridine coenzymes utilizing chromatographic columns charged with ion exchange resins and alkaline elution agents.

The two reduced pyridine coenzymes nicotinamide-adenine-dinucleotide (NADH) and nicotinamide-adenine-dinucleotide-diphosphate (NADPH) play a very important part in biochemical analyses, particularly in connection with clinical-chemical diagnosis. Their use for this purpose is based on the optical test described by O. Warburg in which the decrease in the absorption of the reduced pyridine nucleotide at 340 nm. or at 366 nm. in the course of an enzymatic dehydrogenation is measured and used for the determination of the activity of an enzyme or for the determination of the concentration of a substrate. The purity of the reduced pyridine coenzyme used for the test is therefor of great importance. Depending upon the purity of the oxidized pyridine coenzyme used as starting material and upon the reduction conditions employed, the reduced pyridine coenzyme contains varying amounts of the oxidized form (NAD or NADP), of adenosine-5'-monophosphate, as well as of inhibitors of dehydrogenases. The presence of oxidized pyridine coenzymes has a disturbing effect, particularly where fluorometric measurements are involved. Thus it has been established that adenosine-5'-monophosphate influences, for example, the measurement of phosphorylase activities; and that, some dehydrogenases, especially lactate dehydrogenase (LDH), are very sensitive to inhibitors, the nature of which is very little known.

Since the determination of the activity of LDH in body fluids is of particular diagnostic significance, the provision of an inhibitor-free reduced pyridine coenzyme takes on considerable importance.

The fine purification of reduced pyridine coenzymes by column chromatography has been described by many investigators. For this purpose, because of the necessity of using alkaline elution media, the chromatographic purification has been exclusively carried out with cellulose columns, particularly with columns charged with DEAE-cellulose. An important disadvantage of the known processes is that they are unsuitable for carrying out the purification on a laboratory scale and more so on a large scale because cellulose columns are difficult to manipulate when they are of large dimensions due to their low capacity and the danger of blockage and infection.

In accordance with the invention it has now surprisingly been found that basic exchange resins utilized in conjunction with an alkaline medium result in the excellent separation of reduced pyridine coenzymes.

Thus, according to the present invention, there is provided a process for the chromatographic purification of reduced pyridine coenzymes, which comprises utilizing for the separation, columns charged with weakly basic anion exchange resins which are not present in the hydroxyl form and carrying out the elution with an eluting agent having a pH value of more than 7.5 and preferably having a pH of about 9–12.

The anion exchangers having an optimum separation action for pyridine coenzymes and for related nucleotides suitable for use in the process of the present invention are all commercially available resins and more specifically are the weakly basic resins, the chromatographic range of which usually lies at an acidic pH value and the capacity of which drops off at pH values above 7 to such a considerable extent that their use at pH values above this value is normally not considered desirable or for that matter possible.

Since, however, as is known, the reduced pyridine coenzymes are extremely acid labile and, even at neutral pH value, can only be kept in aqueous solution for a very limited period of time, the use of basic exchange resins for the separation of these pyridine coenzymes was hitherto considered to be impossible as it was to have been expected that these resins could only be used for separation procedures to be conducted in the acidic pH range, whereas reduced pyridine coenzymes could only be handled in the basic pH range in which it was believed that the weakly basic exchange resins could not be satisfactorily employed.

Separations of reduced pyridine coenzymes from impurities of the above-mentioned type can be carried out with particularly favorable results when an elution system is used in which the concentration of the elution agent to be used for the elution of the reduced pyridine coenzyme from the column is adjusted in such a manner that the conditions of a continuous chromatography are substantially maintained. As a result the somewhat less strongly absorbed impurities pass through the column practically without any exchange action with the exchange resin, whereas the more strongly bound impurities require the use of a concentrated solvent for the elution thereof. Therefore for the elution agent, there is selected an ionic strength which advantageously does not lead to a true exchange of the components with the counter-ions of the resin but rather enables the separation to be carried out only by the relative retardation of the various compounds in their passage through the column.

The nature of the loading of the exchange resin is not critical. In principal, for this purpose there can be used all ions which do not contain groups which react with NADH or with NADPH or which can disturb the reaction in any other way. Thus, for the loading, which is usually carried out by equilibration, there can be satisfactorily employed acetate, formate, carbonate and even sulfate ions.

The nature of the elution agent can also be varied within wide limits. However, it is important that for the elution there are used those salt-containing buffer solutions which preferably contain the same anion as that with which the exchanger has been equilibrated. Examples of elution agents which can be used include triethyl-ammonium carbonate, triethyl-ammonium formate, sodium formate, trihydroxymethylaminomethane formate and sodium sulfate.

As has already been set out, the process according to the present invention can be carried out in the relatively wide pH range of 7.5–13. Preferably, however, the process is carried out at a pH of between 9 and 12. The upper limit for the pH range is determined by a concurrent reaction, namely, the exchange of hydroxyl ions from the elution medium against the anion of the resin, as resins loaded with hydroxyl ions do not possess a separating action. The lower limit is determined by the fact that, even at pH 7.0, the stability of the reduced pyridine coenzymes drops off considerably.

As resins, there can be used all weakly basic anion exchange resins, although as just mentioned, resins loaded with hydroxyl ions do not possess a separation action. Typical examples of commercially available resins which can be used include those weakly basic anion exchangers which are available under the names Dowex 1 X2, 1 X4 and Amberlite IR 4 B.

A particularly preferred embodiment of the process according to the present invention consists in the addition of organic solvents to the elution system. In this manner, there is achieved a preparative separation in hitherto unobtainable material concentrations. This addition has the result that, in the case of a suitable mixing ratio, by suppression of the dissociation, it is possible to use lower salt concentrations in the elution buffer system and, at the same time, there takes place a concentrated elution of the desired substance from the column. A mixing ratio is suitable when a dissociation still takes place but is, however, clearly reduced. Additions of about 20–50 vol-percent are generally suitable for this purpose. In the case of the use of larger amounts and depending upon the organic solvent used, dissociation no longer takes place. In the case of the use of smaller amounts, the effect is frequently no longer clearly noticeable.

The compression of the individual fractions results in a sharper separation and thus in a strengthening of the above-mentioned effect. As organic solvents for this purpose there are suitable for use herein solvents which are miscible with water, are not too acidic and do not contain groups which can react with the pyridine coenzymes. Generally speaking, solvents which contain the

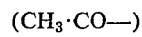

(CH$_3$·CO—)

are not suitable. Examples of organic solvents which can be used include the water-miscible alcohols, dioxan, tetrahydrofuran and dimethyl formamide. Because of its bactericidal action, isopropanol is particularly preferred as an additive to the elution system to be used in the process according to the present invention.

The process according to the present invention makes possible the separation of pyridine coenzymes from one another and from accompanying impurities on a preparative scale, giving particularly good results in a simple and rapid manner. Surprisingly, it has also been observed that, in the case of the process according to the present invention, with increasing alkalinity the very disturbing re-oxidation of NADH to NAD during the chromatography is strongly suppressed.

In the accompanying drawings, there are shown a number of elution curves corresponding to the results obtained in accordance with the several embodiments of the process according to the present invention, which are described in more detail in the following examples. The elution curves were recorded with an automatic recording device which registered the absorption at 250 nm. The various curves show that, by means of the process according to the present invention, there is realized an excellent separation of the reduced pyridine coenzymes from all disturbing accompanying substances. Therefore, the process according to the present invention is suitable for the preparative high purification of the reduced pyridine coenzymes, even on a large scale.

The following examples are given for the purpose of illustrating the present invention but are in nowise to be construed as limitative thereof.

EXAMPLE 1

Dowex 1 X2 (100–200 mesh) was equilibrated with 0.4 M triethyl-ammonium formate having a pH of 7.5. A column having a diameter of 1.8 cm. and a length of 75 cm. was employed in the determination. There were charged to this column 500 mg. NADH dissolved in the same solvent. The elution was carried out continuously, without alteration of the solvent, using 0.4 M triethyl-ammonium formate of pH 7.5, i.e., the same buffer as had been used for the equilibration of the column and for dissolving the NADH.

In FIG. 1 of the accompanying drawing the course of the elution is set out. In the first peak, it is a question of impurities, such as NAD, AMP and other accompanying materials which have hitherto not been identified; frequently, the "pre-peak" which appears immediately before the "main peak" (NADH) contains lactate dehydrogenase inhibitors.

EXAMPLE 2

Figure 2:
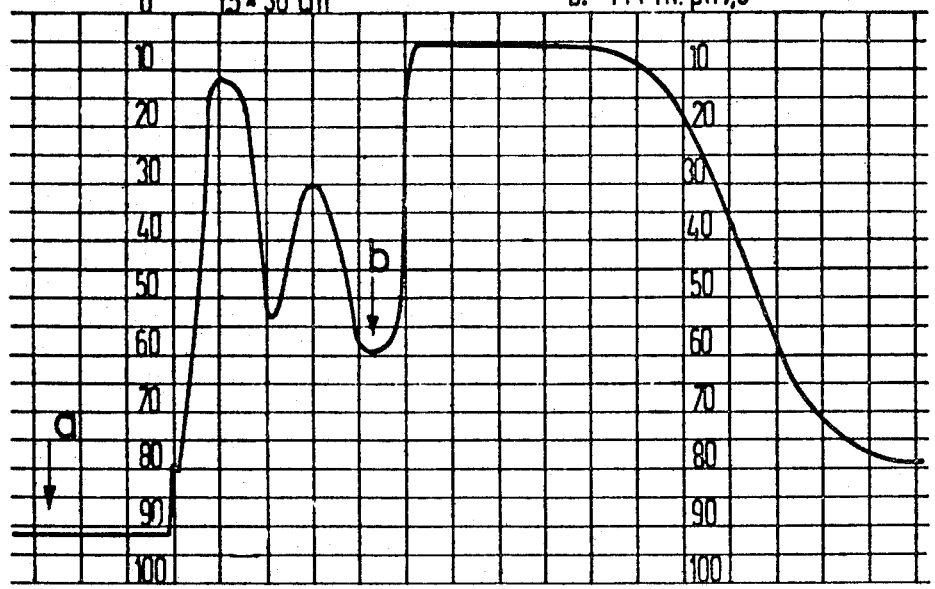

40 ml. Dowex 1 X2 (100-200 mesh) were equilibrated with 0.4 M triethyl-ammonium carbonate buffer having a pH of 7.5. There was used in this run a column having a diameter of 1.5 cm. and a length of 30 cm. 1 g. NADH was dissolved in 2.5 ml. 0.4 M triethyl-ammonium carbonate having a pH of 7.5 and the resulting solution applied to the column, followed by elution with the same elution agent. After the passage of the first two peaks, the concentration of the buffer was increased to 1 M triethylammonium carbonate having a pH of 7.5. Because of this, the broadly spaced peaks of the NADH which can be seen from FIG. 1 of the accompanying drawing, take on a substantially shorter and more compressed form, as can be seen from FIG. 2 of the accompanying drawing.

The foregoing and the following instances of chromatographic procedures are, because of the high loading capacity (short column) during the separation, particularly suitable for preparative work required to be carried out on a large scale.

EXAMPLE 3

Figure 3:
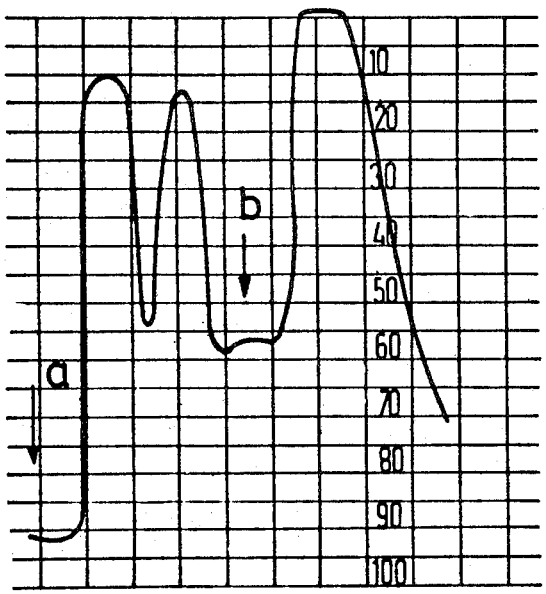

Dowex 1 X2 (100–200 mesh) were equilibrated with a 0.3 M solution of sodium formate in 20% isopropanol having a pH of 8.5. The same column as used in Example 2 was employed in this run. 1 g. NADH was dissolved in 5 ml. of the same buffer and then applied to the exchanger. The elution was also carried out with a 0.3 M solution of sodium formate in 20% isopropanol until the first two peaks appeared in the eluate. Elution is then continued with a 1 M solution of sodium formate in 50% isopropanol having a pH of 8.5. In this way, the NADH was eluted from the column in such a high concentration that it could be precipitated directly from the eluate. This can be seen from FIG. 3 of the accompanying drawing.

EXAMPLE 4

Figure 4:
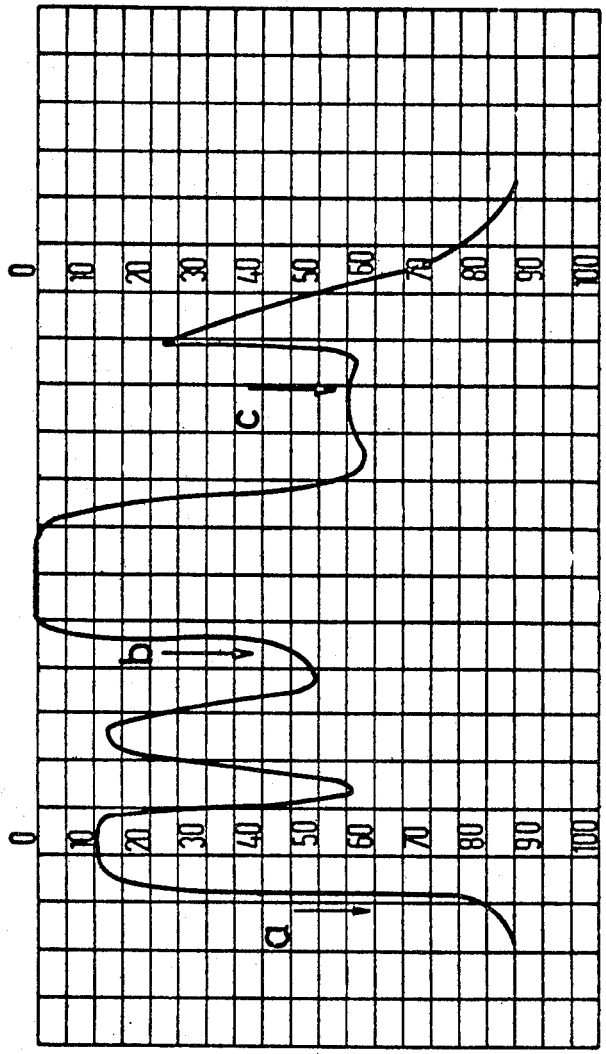

Dowex 1 X2 (100–200 mesh) were equilibrated with a 0.3 M solution of sodium formate in 20% isopropanol having a pH of 8.5 as described in Example 3. The column volume and the amount of NADH used were also the same as disclosed in Example 3. Furthermore, the elution of the first two peaks took place in the manner described in Example 3. After the passage of these first two peaks, the elution was continued with a 0.5 M solution of sodium formate in 50% isopropanol having a pH of 8.5. The NADH appeared in almost the same concentration as set out in Example 2. A subsequent increase in the concentration to 1 M sodium formate in 50% isopropanol having a pH of 8.5 gave a further peak which exhibited a strongly inhibiting action on the lactate dehydrogenase activity. FIG. 4 of the accompanying drawing sets out the degree of purification which was achieved.

EXAMPLE 5

Figure 5:
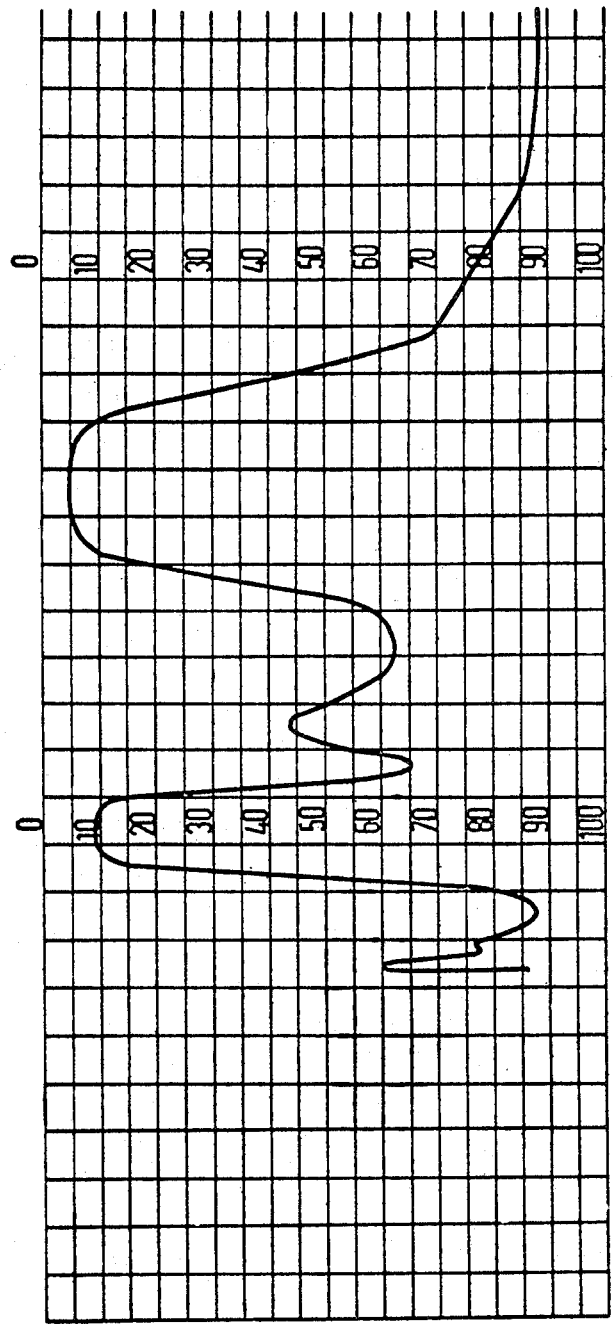

An exchanger column of Dowex 1 X2 (100–200 mesh) was equilibrated with a 0.4 M solution of sodium formate in 20% isopropanol having a pH of 8.5. There was subsequently applied to the column a mixture of 30 mg. NADP and 120 mg. NADPH. The elution was carried out with a gradient which ranged from a 0.4 M solution of sodium formate in 20% isopropanol having a pH of 8.5 to a 1 M solution of sodium formate in 50% isopropanol having a pH of 8.5. As can be seen from the elution curve of FIG. 5 of the accompanying drawing, under the aforesaid conditions, it was possible to achieve an excellent separation of NADPH from NADP.

EXAMPLE 6

The procedure which has been described in Example 3 was repeated with the exception that the elution agent used was adjusted to a pH of 10.5. Only 0.2% NAD could be detected in the NADH obtained, in contradistinction to 0.5–1% in the case where the more weakly alkaline medium was used.

EXAMPLE 7

Figure 6:
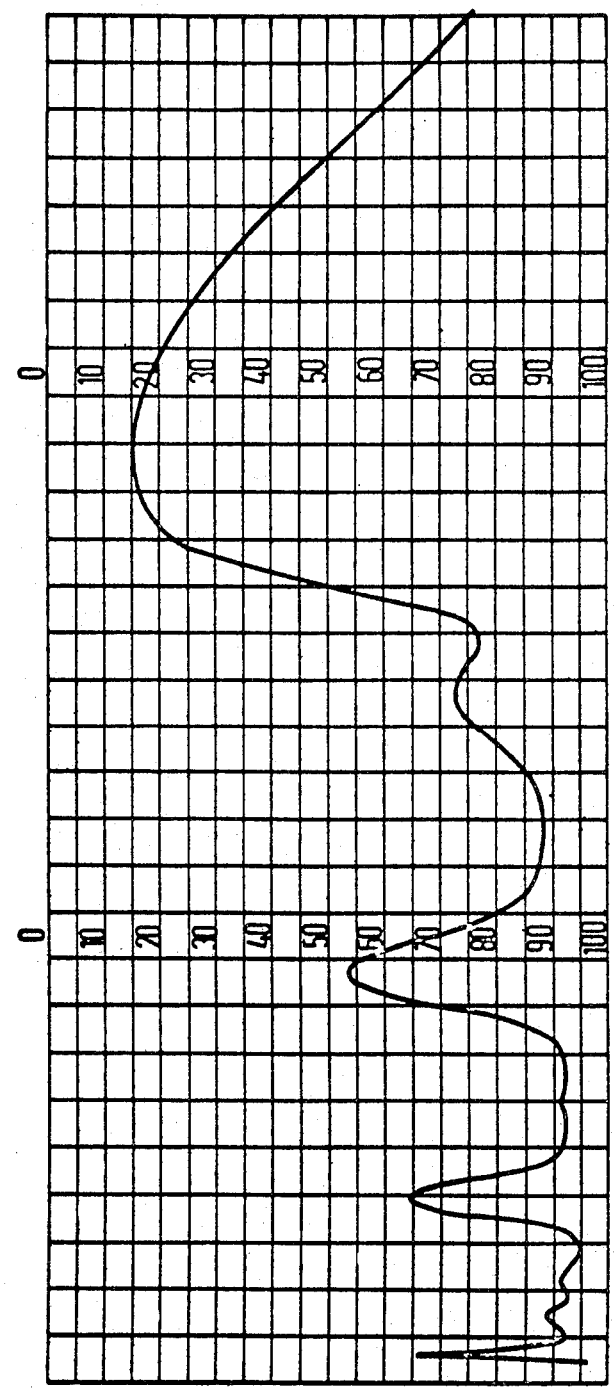

Dowex 1 X4 (100–200 mesh) was converted into the sulfate form with a 0.5 N solution of sodium sulfate having a pH of 8.5. The exchange resin was thereafter washed with water which had been made weakly alkaline and 250 mg. NADH dissolved in 2 ml. water were then applied to the column. The subsequent gradient elution which had a gradient which went from weakly alkaline water having a pH of 10.5 to 0.5 M sodium sulfate having a pH of 10.5 again showed a satisfactory separation of NAD from NADH. The foregoing can readily be seen from FIG. 6 of the accompanying drawing.

EXAMPLE 8

1.5 x 30 cm. anion exchanger column of the Dowex 1 X4 type was equilibrated with 90% methanol to which there had been added, per litre, 1 cc. 1 N sodium hydroxide solution. Thereafter, 1 g. NADH dissolved in 2 ml. 50% methanol, was applied to the column. A transitory precipitation of the NADA could be avoided by slight movement of the upper layer of the exchanger. Elution was then carried out with a gradient which ranged from 90% methanol having a pH of 10.5 to a 1 M solution of sodium formate in 90% methanol having a pH of 10.5. After the passage of two pre-peaks, there appeared the main peak which contained the NADH. The NADH could be directly precipitated from the eluate by the conventional methods. The satisfactory separation thereby achieved can be seen from FIG. 7 of the accompanying drawing.

In the case of all the above examples, the NADH could be separated from the eluates by the use of known methods, for example by fractional precipitation with organic solvents, such as ethanol, or for example, in the form of its barium salt.

What is claimed is:

1. Process for the chromatographic purification of reduced pyridine coenzymes selected from the group consisting of nicotinamide-adenine-dinucleotide (NADH) and nicotinamide - adenine - dinucleotide - diphosphate (NADPH) which comprises applying a solution of such coenzymes to a chromatographic column charged with a weakly basic anion exchange resin which is not present in the hydroxyl form, carrying out the elution with an elution agent having a pH value between 7.3 and 13 and recovering the separate eluted fractions.

2. Process according to claim 1 wherein said elution agent has a pH of from about 9 to 12.

3. Process according to claim 1 wherein said coenzymes are applied in the form of their solution in a solvent selected from the group of triethyl-ammonium carbonate, triethyl-ammonium formate, sodium formate, trihydroxymethylaminomethane formate and sodium sulfate.

4. Process according to claim 1 wherein prior to applying the solution of coenzymes to said column charged with exchange resins said column is equilibrated by passing therethrough the same solvent as that utilized for forming the solution of coenzymes.

5. Process according to claim 1 which comprises carrying out the elution at a constant pH and with increasing ion concentration.

6. Process according to claim 1 which comprises incorporating into said elution agent a water-miscible organic solvent which does not contain any group which can react with the pyridine coenzymes.

7. Process according to claim 6 wherein said organic solvent is present in an amount of from 20 to 50 vol.-percent.

8. Process according to claim 6 wherein said organic solvent is a member selected from the group of water-miscible alcohols, dioxan, tetrahydrofuran and dimethyl formamide.

9. Process according to claim 8 wherein said organic solvent is isopropanol.

10. Process according to claim 1 wherein said exchange resin is loaded with a member selected from the group consisting of acetate, formate, carbonate and sulfate ions.

References Cited

UNITED STATES PATENTS

| | | | |
|---|---|---|---|
| 3,157,636 | 11/1964 | Sanno et al. | 260—211.5 |
| 3,271,386 | 9/1966 | Huang | 260—211.5 |
| 3,366,627 | 1/1968 | Jacob et al. | 260—211.5 |
| 3,433,782 | 3/1969 | Kreiser | 260—211.5 |
| 3,435,026 | 3/1969 | Samejima et al. | 260—211.5 |
| 3,493,558 | 2/1970 | Samejima et al. | 260—211.5 |

LEWIS GOTTS, Primary Examiner

J. R. BROWN, Assistant Examiner